United States Patent [19]

Morita et al.

[11] 4,366,110

[45] Dec. 28, 1982

[54] SCREW IN-LINE TYPE INJECTION MOLDING METHOD AND APPARATUS FOR LOW-PRESSURE INJECTION MOLDING

[75] Inventors: Akiyoshi Morita; Mitsuyoshi Sato, both of Toyota, Japan

[73] Assignee: Toyota Jidosha Kabushiki Kaisha, Aichi, Japan

[21] Appl. No.: 136,083

[22] Filed: Mar. 31, 1980

[30] Foreign Application Priority Data

Mar. 31, 1979 [JP] Japan .................................. 54-38810

[51] Int. Cl.³ ............................................. B29F 1/06
[52] U.S. Cl. ............................................. 264/328.13
[58] Field of Search ................................... 264/328.13

[56] References Cited

FOREIGN PATENT DOCUMENTS 2805659 8/1978 Fed. Rep. of Germany ........................ 264/328.13

Primary Examiner—Thomas P. Pavelko
Attorney, Agent, or Firm—Oblon, Fisher, Spivak, McClelland & Maier

[57] ABSTRACT

A low-pressure screw in-line type injection molding method and apparatus for use with materials such as urea mixed resin powder are disclosed. The initial injection is performed at a converted injection pressure in the range of 250–700 Kg/cm² and at an injection velocity in the range of 30–50 mm/sec. when the mold cavity has become nearly completely filled, the converted injection pressure is lowered to 50–200 Kg/cm² for the completion of the injection cycle under low pressure conditions.

3 Claims, 2 Drawing Figures

SCREW IN-LINE TYPE INJECTION MOLDING METHOD AND APPARATUS FOR LOW-PRESSURE INJECTION MOLDING

BACKGROUND OF THE INVENTION

1. Field of the Invention

The present invention relates to a method and apparatus for screw in-line type injection molding, and more specifically to a low-pressure screw in-line type injection molding method and apparatus for the low-pressure injection molding of urea mixed resin powder.

2. Description of the Prior Art

In the molding process utilized by most popularly marketed screw in-line type injection molding machines, the materials to be molded must be smoothly fed out of a hopper into an injection cylinder. For this purpose the particle size of the materials is usually adjusted to prevent bridging and to assure a good supply. The materials supplied are sent to the tip of the injection cylinder while simultaneously being molten or plasticized and mixed together by a rotating screw. Thereafter the screw is pushed back by the reactive force of the materials, and when a specified volume has been forwarded, a limit switch acts to stop the screw rotation. The materials are then injected into the cavity of a metal mold.

In the conventional screw in-line type injection molding machine the injection pressure and the injection velocity are closely related to each other. Depending on the respective stages of the plasticized molten or the plasticized state of the materials, the pressure and the velocity are respectively adjusted by a pressure control valve and a flow rate control valve in a hydraulic circuit. In the current practice the optimum values of the injection pressure, velocity, and time are usually set empirically. In the case of thermosetting resins, such as phenol resin and urea resin, the injection pressure is set as high as 1000–1500 $Kg/cm^2$ and the injection velocity is set at more than 50 mm/sec for one injection shot of 20–200 g.

The pressure-hold time, defined as the duration of time during which the molten or plasticized material to be molded is held in the cavity of the metal mold under a specific pressure after being ejected from the injector nozzle, has a great influence particularly on the shrink rate of the molded product. Accordingly, the material is usually held in the mold at a pressure less than or equal to the injection pressure for a considerable length of time until the materials cease to flow back out of a sprue of the mold and the shrinkage of the molded product becomes minimal. It is said that the necessary holding time is 5–20 seconds.

Conventionally, materials of this kind can be molded by two methods one using a plunger type injection molding machine; and the other using a screw in-line type injection molding machine which operates under a high pressure.

These methods, however, have the following drawbacks. In the first method, a preheat-melting chamber is required; the machine is complicated and inferior in workability; the productivity is poor, because the materials have to be perfectly molten and in consequence the cooling time after injection into the cavity of the metal mold becomes long; and, since urea mixed resin has to be heated to a temperature over the melting point for a long time, this process not only adversely affects the properties of urea mixed resin but also contaminates the work environment with ammonia gas and cyanogen generated thereby.

In the second method using a high pressure for injection, a heavy machine is required. Due to the high pressure the metal mold must be a rugged one, and accordingly it is difficult to produce a profile containing a low-strength core made from, for example, ceramic material.

To eliminate these drawbacks, the best method is to use a screw in-line type injection molding machine with an extremely low pressure. However, the conventional technology does not produce a good molded product by injection at an extremely low pressure because an injection resistance is inherent in the injection molding machine itself.

The present invention renders it possible to make a low-pressure injection of, specifically, urea mixed resin powder, using the screw in-line type machine.

SUMMARY OF THE INVENTION

Accordingly, one object of the present invention is to provide a screw in-line type injection molding method and a low-pressure screw in-line type injection molding apparatus for the low-pressure injection molding of urea mixed resin powder, characterized in that the initial injection is performed at a converted injection pressure in the range of 250–700 $Kg/cm^2$ and at an injection velocity in the range of 30–50 mm/sec and when the mold cavity has become nearly completely filled, the converted injection pressure is lowered to 50–200 $Kg/cm^2$ for the completion of the injection cycle under low pressure conditions.

More specifically, an object of the present invention is to provide a screw in-line type injection molding method and a low-pressure screw in-line type injection molding apparatus for the efficient manufacture of high quality molded products using urea mixed resin powder, characterized in that the initial injection is performed at a converted injection pressure in the range of 250–700 $Kg/cm^2$ and at an injection velocity in the range of 30–50 mm/sec and when the mold cavity has become nearly completely filled, the converted injection pressure is lowered to 50–200 $Kg/cm^2$ for the completion of the injection cycle under low pressure conditions

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
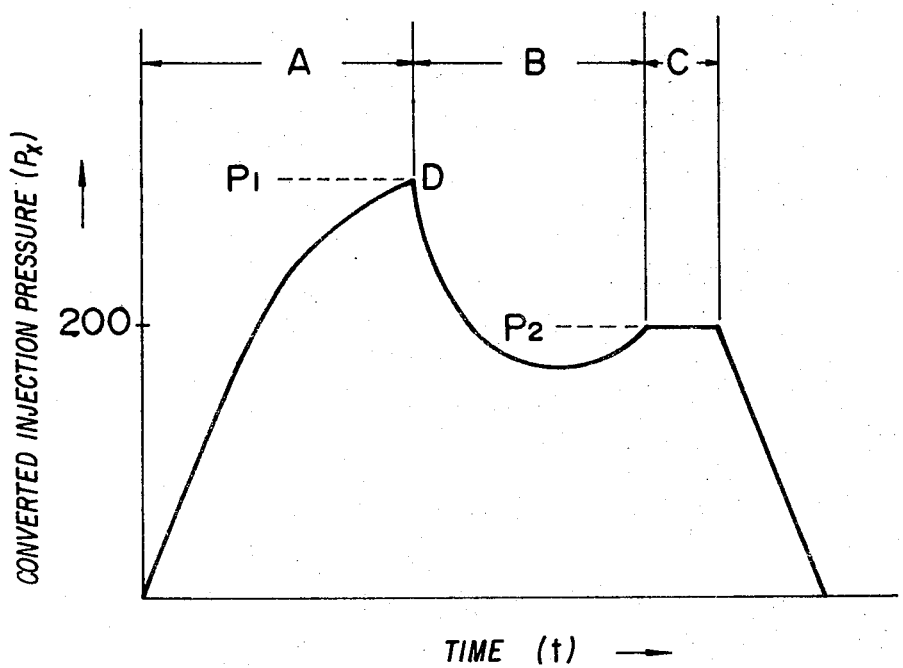
FIG. 1 is a diagram illustrating the basic injection molding method according to the present invention in terms of the cylinder pressure vs. time.

Referring now to the drawings, wherein like reference numerals and letters designate identical or corresponding parts throughout the several views, and more particularly to FIG. 1 thereof, a first preferred embodiment of the present invention is illustrated.

In FIG. 1 the basic injection molding method according to the present invention is illustrated in terms of the pressure within the cylinder (hereinafter referred to as "converted injection pressure"Px) plotted against time t. In FIG. 1, the period A is the initial charge time during which the required injection velocity is in the range of 35 mm/sec–50 mm/sec, and preferably 40–50 mm/sec. If the injection is performing at a velocity of lower than 35 mm/sec, the injection into the cavity of the metal mold will be performed at a very low final charge pressure. Consequently, the urea mixed resin powder, which has been melted or plasticized in the injection cylinder, will become cooled and solidified resulting in a poor flow of the molten or plasticized resin because the molten or plasticized powder fails to be fully injected at such a low injection pressure. On the contrary if the velocity is greater than 50 mm/sec, the control by the limit switch will become difficult and, moreover, the valve response must be improved to enable low-pressure injection, resulting in an increased cost of manufacture.

The urea mixed resin powder, to be used in the present invention, can be produced, for example, by the method disclosed in Swiss patent application No. 4439/73 filed on Mar. 28, 1973.

The pressure $P_1$ is the initial charge pressure, i.e., an injection resistance generated when the injection is performed under a pressure of 25 $Kg/cm^2$–70 $Kg/cm^2$ (250 $Kg/cm^2$–700 $Kg/cm^2$ in terms of converted injection pressure) and an injection velocity of 35 mm/sec–50 mm/sec as set by a remote control valve.

The converted injection pressure is preferably set at 400 $Kg/cm^2$–700 $Kg/cm^2$. If the pressure is more than 700 $Kg/cm^2$, it is difficult to manufacture a metal mold that can withstand the pressure; and moreover, there is a risk that the screw will be damaged. It is likely that a poor material flow will occur if the converted pressure is less than 250 $Kg/cm^2$.

The injection resistance referred to above includes a viscosity change which occurs when urea mixed resin powder is cooled and solidified after being melted or plasticized, and a resistance encountered at the mold sprue when the molten or plasticized powder passes therethrough. The value of the pressure $P_1$ increases with the injection velocity. The pressure $P_1$, however, does not directly act on the cavity of the metal mold.

In FIG. 1, D is a position at which a limit switch controlling the injector shifts from high-velocity, high-pressure injection to low-pressure injection. Position D must be adjusted such that the shift occurs just before the cavity becomes completely charged in order to prevent the cavity from being subjected to excessive pressure. Normally the shift is effected at the time when the cavity is 80–95% and preferably 85–95% full.

When the shift is made prematurely, charging will become difficult due to the injection resistance in the course of the subsequent low-pressure injection, and a poor flow of the molten or plasticized resin will result. If the shift occurs too late, the initial high pressure and high velocity will act as a cavity pressure and the core will be broken.

The period B represents a low-velocity, low-pressure injection time during which an insufficient charge in the cavity, resulting after the period A, can be fully compensated. If the velocity in this period is too fast, a surge pressure will be generated no matter how low the final charge pressure becomes; and, ultimately a high pressure will occur resulting in a broken core. $P_2$ is the pressure at which the cavity becomes filled. This pressure is set to be 5–20 $Kg/cm^2$ (50–200 $Kg/cm^2$ in terms of converted injection pressure or preferably 50–150 $Kg/cm^2$). If the converted pressure is below 50 $Kg/cm^2$, a poor flow of the molten or plasticized resin will result. A higher pressure will render the use of a ceramic core impossible. In the post-charge period C, the pressure is set equal to or lower than $P_2$.

Figure 2:
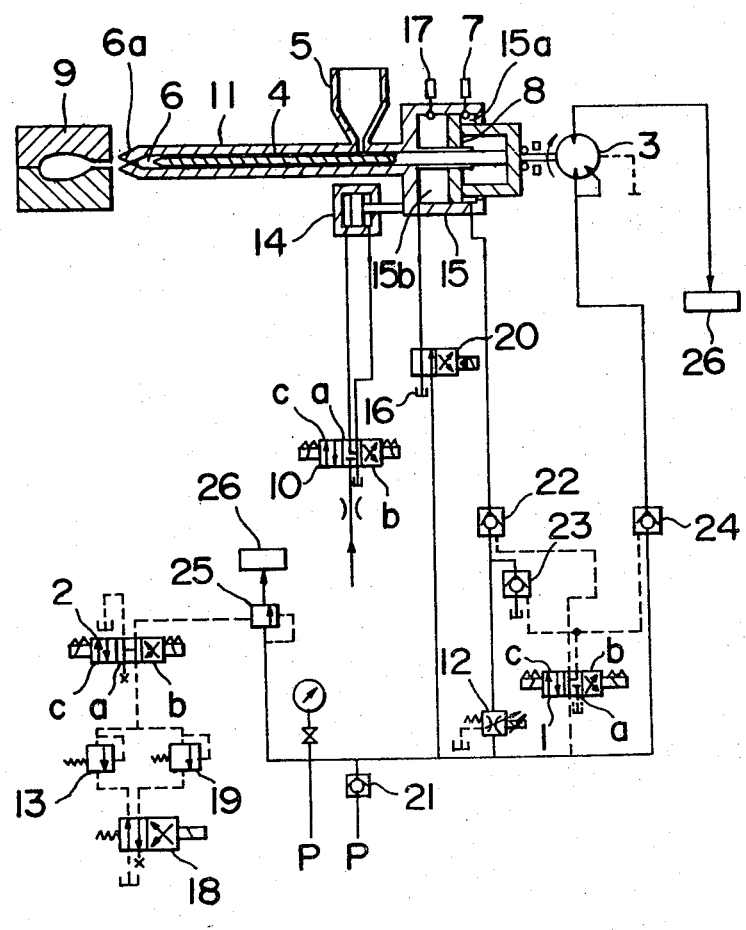
FIG. 2 is a diagram illustrating a machine adapted to implement the injection molding method according to the present invention.

FIG. 2 illustrates an example of a hydraulic circuit for the screw in-line type injection molding machine according to the present invention. As seen from FIG. 2, the machine according to the present invention is composed of a hopper 5 and a screw 4 which is inserted into an injection cylinder 11. The injection cylinder includes a nozzle 6a at one end and a hydraulic chamber 15 at the other end such that the screw may rotate and may be axially moved within the injection cylinder 11. A hydraulic motor 3 is connected to rotate the screw 4. An injection piston 8 is slidably inserted into the hydraulic chamber 15 to divide the chamber 15 into a first chamber 15a and a second chamber 15b. The piston is connected to the screw 4 such that the piston and screw move together within the chamber 15. A first limit switch 7 is installed at a position such that it is contacted by the injection piston 8 when the screw 4 is withdrawn to a distance which is sufficient to create a space equivalent to the necessary supply of a molten or plasticized urea mixed resin powder at the tip of the injection cylinder. A second limit switch 17 is installed at a position such that it is contacted by the injection piston 8 when the screw 4 has moved forward a distance sufficient for the necessary supply of the molten or plasticized urea mixed resin powder to be nearly fully injected. The machine further includes a hydraulic circuit, which sends pressurized oil to shift the pressure in the second hydraulic chamber 15a to high or low levels, and a hydraulic chamber 14 equipped with a piston to move the injection cylinder 11 forward or backward. The chamber 14 is connected to the hydraulic circuit.

In this machine, when the solenoid valves 1 and 2 move from position a to position b, the working hydraulic oil sent from the pump P goes to the hydraulic motor 3 to rotate the screw 4. Urea mixed resin powder supplied from the hopper 5 is moved forward, while being heated and mixed, to the tip 6 of the injection cylinder by the driving screw 4 and in reaction thereof the screw 4 recedes to the right in the figure. When the necessary amount of the urea mixed resin powder has been supplied to the cylinder tip 6, the injection piston 8 contacts the limit switch 7, whereupon the solenoid valves 1 and 2 move from position b to position a, thereby stopping the motion of the screw 4. Next, upon confirmation of the metal mold 9 being tightened by means of a suitable sensor the solenoid valve 10 changes from position a to position b causing the injection cylinder 11 to move forward until it closely contacts the metal mold 9. Then upon confirmation by means of a suitable sensor that the nozzle has reached the limit of its forward movement, the solenoid valves 1 and 2 move from position a to position c. The working hydraulic oil coming from the pump P then passes through the throttle of the electro-magnetic flow control valve 12, thereby having its injection velocity adjusted. Then with its pressure adjusted by the remote-control valve 13 for high-pressure injection, the working hydraulic oil reaches the first hydraulic chamber 15a. Thereupon the injection piston 8 causes the screw to slide to the left in the figure thereby injecting the molten or plasticized powder into the metal mold. Meanwhile the working hydraulic oil in the hydraulic chamber 15b flows into the tank 16. The injection causes the piston 8 to move to the left in FIG. 2. When the piston contacts the limit switch 17 just before the molten or plasticized powder has filled the cavity 9 of the metal mold, the solenoid valve 18 operates thereby actuating the remote-control valve 19 for low-pressure injection, whereupon the final charging is performed at an extremely low pressure. After the material thus injected to fill up the cavity 9 is held for a specified time period, the solenoid valve 20 operates to send the working hydraulic oil to the pressure chamber 15b, causing the piston 8 to recede again. The screw 4 is now ready to rotate at the first position.

The solenoid valve 20 shown in FIG. 2 is operated when the injection piston 8 is to be manually moved backward. Reference numeral 21 in FIG. 2 is a check valve; 22, 23 and 24 are pilot check valves; 25 is a relief valve; and 26 is an oil-cooler.

As described above, the injection molding method according to the present invention produces excellent results. For example, urea mixed resin powder, which is usually difficult to mold, can be molded with excellent results, using a screw in-line type molding machine. Also, there is no likelihood of the core being damaged or the flow of the material becoming poor, because the injection pressure can be lowered just before the final charging.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A low pressure injection molding method for urea mixed resin powder using a screw in line type injection molding machine having an injection cylinder, an injection piston, a hydraulic control circuit for controlling hydraulic pressure and a metal mold cavity, wherein said method comprises:

charging a molten and plasticized urea mixed resin powder into said metal mold cavity so as to initiate filling of said metal mold cavity with said urea mixed resin powder during a primary injection phase;

maintaining the pressure of said urea mixed resin powder within said injection cylinder from 250 to 700 kg/cm$^2$ during said primary injection phase;

maintaining the velocity of said urea mixed resin powder during said primary injection phase within said injection cylinder from 35 to 50 mm/sec;

stopping said primary injection phase when said filling of said cavity is within a range of 80 to 95 percent filled;

further charging said urea mixed resin powder into said metal mold cavity so as to complete said filling of said metal mold cavity with said urea mixed resin powder during a secondary injection phase;

maintaining said pressure of said urea mixed resin powder within said injection cylinder from 50 to 200 kg/cm$^2$ during said secondary injection phase; and maintaining said pressure of said urea mixed resin powder within said metal mold cavity for a predetermined period of time under a predetermined holding pressure equal to or less than said pressure maintained during said secondary injection phase after completing said primary and secondary injection phases.

2. A low pressure injection molding method for urea mixed resin as recited in claim 1 which further comprises:

maintaining said pressure of said urea mixed resin within said injection cylinder from 400 to 700 kg/cm$^2$ during said primary injection phase;

maintaining the velocity of said urea mixed resin during said primary phase within said mold cylinder from 40 to 50 mm/sec;

stopping said primary injection phase when said filling of said cavity is within a range of 85 to 95 percent filled; and maintaining said pressure of said urea mixed resin within said cylinder from 50 to 150 kg/cm$^2$ during said secondary injection phase.

3. A low pressure injection molding method for urea mixed resin powder as recited in claim 1 or 2 which further comprises:

changing the pressure within said injection cylinder from said primary injection phase to said secondary injection phase via movement of said injection piston; and controlling said movement of said injection piston via said hydraulic control circuit.

* * * * *